Patented Mar. 12, 1940

2,192,951

UNITED STATES PATENT OFFICE 2,192,951

NONHYGROSCOPIC STARCH CONVERSION PRODUCT AND METHOD OF MANUFACTURE

Ottomar Wolff, Berlin, Germany, assignor to American Maize-Products Company, a corporation of Maine No Drawing. Application March 19, 1938, Serial No. 196,899. In Germany January 14, 1931

4 Claims. (Cl. 127—29)

My invention relates to starch conversion products and more particularly to a dry, solid, nonhygroscopic corn syrup product and its method of manufacture.

This application is a continuation in part of my application Serial No. 686,187, filed August 21, 1933.

For many years there has been a desire in the corn products industry to produce a dry, solid product from corn syrup, commonly known as glucose, that on exposure to the atmosphere would remain as a dry, stable, substantially nonhygroscopic, solid material. Such a product would be easily handleable and could be conveniently packaged in cardboard boxes, paper containers, sacks, etc. Due to the relatively light weight of the dry product and that of the suitable containers as compared with the heavy liquid corn syrup and its usual metal containers, it could be shipped economically. Another recognized advantage of a solid dried corn syrup is that it contains dextrose in readily assimilable form and therefore is a desirable constituent of infant food; also, it is useful as a filler and nutritive material for ice cream, confections and bakery products. Furthermore, it could be used as a sizing for paper and textiles.

In view of the recognized advantages and wide potential uses of a solid dry corn syrup product numerous attempts have been made heretofore to dry corn syrup to a solid form. As far as I am advised however none of these attempts has been successful in producing a commercially satisfactory product; the principal difficulty being the strong hygroscopic properties of the corn syrup which prevent the production of a dry, stable, relatively nonhygroscopic product that can be packaged and stored without caking. The solid corn syrup products heretofore produced would not remain dry in storage or shipment. It has proven difficult to effect substantially complete dryness in these products initially and even when reduced to a fine powder they readily absorb moisture from the atmosphere and lose the desired dry powdery form by lumping and caking together. The term "nonhygroscopic" as used in the specification and claims herein to identify the products of this invention is intended to cover principally those products that are sufficiently nonhygroscopic to permit shipping in the ordinary manner without lumping or caking of the material over a reasonable period of time, and should not be limited to completely hygroscopic products that will not absorb any moisture.

When ordinary corn syrup is heated to remove the water and form a solid material, the resulting product is hygroscopic and is not satisfactory. The usual procedure for producing the converted corn syrup is to subject a corn starch-water suspension to the action of heat, pressure and a starch conversion acid such as hydrochloric acid. By this treatment the starch is converted into a mixture of dextrines, maltose and dextrose, the amount of the two reducing sugars, maltose and dextrose formed under standard conditions being dependent upon the length of time employed for the conversion reaction. The resulting conversion liquor is neutralized, filtered, bleached and concentrated to a syrup of the desired Baumé, according to known processes.

For the production of commercial glucose the conversion reaction is normally stopped at the point where the amount of reducing substances calculated to dextrose on a dry solids weight basis is about 40% or higher. As is well known, however, the conversion reaction may be carried out for any desired length of time so that the resulting conversion liquor may contain substantially more or less dextrose than the above mentioned percentages commonly present in commercial glucose. This factor has been used to advantage in my present invention as explained below.

I have discovered that converted starch syrups particularly corn syrups whose dextrose content comes within a certain range of percentages of the total solids in the syrups, when subjected to a drying process will produce the above described dry, relatively stable, nonhygroscopic, solid product. The top limit of the desirable range is determined by the fact that as the dextrose content is increased, the hygroscopic qualities of the syrup or dry products resulting from the same also tend to increase. In practice, I have found that a dextrose content of approximately 36% on a dry weight basis includes most of the satisfactory material, though this limit may if desired be increased somewhat.

At the lower end of the range, the limit is determined by the requirements of the syrup. A syrup having between about 32% and 34% of dextrose calculated on a dry weight gives very satisfactory results. Products with a dextrose content of about 32% and below that can be dried and also are not hygroscopic but perhaps these cannot properly be termed syrups because they tend to become cloudy by separation of dextrin. This however is unimportant when the material is to be dried and therefore in accordance with my invention it is permissible to use a conversion product having less than 32% of dextrose. However, it will not ordinarily be worthwhile to use a product having less than about 27% of dextrose. Actually, for many purposes, products having between 28% and 32% of dextrose have been found to have considerable commercial value.

The syrup of proper dextrose content may be dried according to any one of several methods such as those described below to produce a satisfactory nonhygroscopic product, the essential feature in each case being the predetermined proper percentage of dextrose content in the syrup. From the standpoint of producing a product having a desirable color, I have found it of advantage to maintain during the conversion a definite optimum degree of acidity to avoid any tendency for the syrup to turn yellow.

An object of my invention is to provide a substantially dry solid, nonhygroscopic product from converted starch syrup.

In accordance with one illustrative embodiment of my invention a desirable nonhygroscopic corn syrup product may be prepared according to the following procedure.

An aqueous starch suspension of about 16° Bé. to 22° Bé. is placed in a conventional starch converter containing a suitable amount of a starch conversion acid, such as for example, hydrochloric acid. The converter is closed and the mixture of starch, water and acid is heated under pressure with agitation to convert the starch into dextrines and dextrose. The conversion process is so regulated as to time, strength and amount of acid, temperature and pressure that the resulting conversion liquor has a dextrose content within the aforesaid range of desirable percentages. The calculated time of conversion of the starch liquor to give the desired dextrose percentage may be checked by removing samples of the liquor from the converter at different stages and testing these samples with iodine until a sample containing the desired dextrose content is obtained. After the conversion reaction has been carried to the desired extent the conversion liquor is removed from the converter and purified according to known processes which include neutralizing the liquor with soda ash, filtering to remove precipitated and fibrous matter and bleaching the liquor by passing it through bone filters. This treated liquor is then concentrated in vacuum pans to the desired concentration. The properly converted and purified liquor is now ready for drying to produce the desired dry solid nonhygroscopic product. The drying process may be effected in several different ways such as the following:

The converted liquor may be heated in the above mentioned vacuum pans until it has a desired low moisture content. This drying will ordinarily take place at temperatures beginning at about 160° F. and ending at about 240° F. After solidification the resulting dry product may be ground to any desired degree of fineness.

Alternatively, the converted, purified and concentrated liquor as it comes from the vacuum pan may be dried by applying it to a drum drier wherein the temperature of the material being dried should not exceed about 145° C. to avoid discoloration of the product. The relatively dry mass produced in the drum drier although substantially free of water, is still plastic when warm and may be formed by known methods into any desired shape, for example, plates, cubes, grains, etc.

A third method for drying the converted, purified and concentrated liquor comprises atomizing or spray drying this syrup in a conventional type of spray drying apparatus. The concentrated syrup is atomized or sprayed into the top of a drying chamber wherein it comes in contact with heated gases which vaporize the water contained in the syrup thereby effecting drying of the syrup into minute solid particles while the latter are suspended in the heated gases. These particles fall through the gaseous medium, which is of decreasing temperature going from the top to the bottom of the drying chamber. The dried particles are collected as a powder at the bottom of this chamber. The drying air or gas may enter the top of the drier at a temperature of approximately 300 to 500° F. and the air or gas leaving the chamber at the bottom at a temperature of approximately 150° F. to 300° F. The fine powdered product produced by this spray drying process is of a noncrystalline nature and contains preferably not more than about 5% moisture. For all practical purposes the powder is dry and in view of the fact that it was made from a syrup of the proper dextrose content, as explained above, it will remain relatively nonhydgroscopic on exposure to the atmosphere. The powder may therefore be packaged, stored and shipped in the same manner as pure crystalline dextrose or "70" sugar which are commercial converted starch solid products.

It is to be understood that the above described processes for converting, purifying and concentrating the starch liquor are not the only processes that may be used to produce the desired dry nonhygroscopic product of this invention. Various changes may be made in the materials and operating conditions employed without departing from the scope of my invention. Likewise various other methods than those described above by way of example may be used for drying the converted syrup to produce the desired dry solid product. However, the feature of my invention that is essential to the product of a commercially satisfactory product is the above described control of the dextrose content of the converted syrup which is to be subsequently dried. So long as the dextrose content of this syrup is within the aforementioned desirable ranges the other steps in the process may be varied widely and a satisfactory product still produced.

While special mention has been made of corn as the source or base material for the starch conversion products used in this invention, it is to be understood that other suitable amylaceous materials may be employed, for example, rice, potatoes, beans, peas and other cereals.

Some of the novel features of my invention are defined in the appended claims.

I claim:

1. A substantially dry, nonhygroscopic sugar product comprising a solidified starch conversion syrup having a reducing sugars content of about 27% to 32% based upon the weight of total solids in said syrup.

2. A new product consisting of dried powdered corn-syrup having a reducing sugar content calculated to dextrose of not more than approximately 31% and of not less than approximately 28% on the basis of the total solid contents of the syrup.

3. A method of producing substantially dry, nonhygroscopic, powdered corn syrup which comprises converting corn-starch into corn-syrup containing reducing sugars calculated to dextrose not exceeding approximately 32% and not less than approximately 27% on the basis of the total content of solids, and reducing said syrup to a dry powder.

4. A process for the production of a dry product from starch syrup characterized in that syrup having a reducing sugars content of approximately 28% to 31%, based on the total solid contents of the syrup, is subjected to a drying operation.

OTTOMAR WOLFF.